Patented July 7, 1936

2,046,507

UNITED STATES PATENT OFFICE 2,046,507

STABLE SODIUM FORMALDEHYDE SULPHOXYLATE AND PROCESS OF PREPARING THE SAME

Louis Freedman, Schodack Center, N. Y., assignor to Winthrop Chemical Company, Inc., New York, N. Y., a corporation of New York No Drawing. Application July 14, 1934,
Serial No. 735,285

14 Claims. (Cl. 23—250)

This invention relates to a stable preparation of sodium formaldehyde sulphoxylate and the process of preparing it.

Sodium formaldehyde sulphoxylate is the sodium salt of formaldehyde sulphoxylic acid. When pure it crystallizes with two molecules of water, having the following formula:

$$OHCH_2.SO_2.Na.2H_2O.$$

It is a very strong reducing agent. The product as ordinarily obtained is unstable in the presence of acids and strong alkalies and slowly decomposes in the presence of atmospheric oxygen forming thiosulphates, sulphites and free sulphur which react with the formaldehyde to form products having a strong garlic-like odor. Decomposition can be detected readily by this strong peculiar garlic-like odor.

The preparation of sodium formaldehyde sulphoxylate by reduction of formaldehyde bisulphite with zinc dust and acetic acid is described in Ber. 38, 1076; 1905. The technical product, as used in commerce, occurs in white irregular lumps and is said to be stabilized by addition of excess formaldehyde and excess alkali (sodium hydroxide). The technical product is thus considered to be more stable than the pure crystalline product.

A recent article in Public Health Reports, No. 48: 1543 (1933) which also appears in the Journal of the American Medical Association No. 102:1273 (1934) reports the successful use of sodium formaldehyde sulphoxylate as an antidote for mercurial poisoning. It is stated in this report that the commercial product is impure, and hence is unsuitable for injection intravenously. The report recommends the use of pure samples and the fresh preparation of the samples before used. In this connection it indicates that the purified product even in evacuated ampules is stable for only a few weeks.

This report on page 1547 also describes a method of purifying the technical product which involves the dissolution of the technical product in water at a temperature not exceeding 70° C. The solution should contain an excess of formaldehyde and should give an alkaline reaction to litmus, sodium carbonate being added if necessary, to obtain this result. The solution is cooled and the crystalline product filtered and washed with cold water. The crystalline product thus obtained is designated as being pure and substantially free from excess alkali. It is unstable in the air and is said to be stable only for a limited time when stored in ampules under vacuum.

According to another method of purification suggested by the trade, a small excess of formaldehyde is present during the purification. In addition the solution of the parent technical product is kept alkaline with a little soda ash. The product obtained in this way, however, even in its pure state is not stable for any length of time.

The product of this procedure as well as the product resulting from the method described in the public health reports is either neutral to litmus or only slightly alkaline. In other words, its content of alkali is substantially negligible.

It will be appreciated from the above that the instability of pure sodium formaldehyde sulphoxylate has seriously mitigated against its use as a pharmaceutical product suitable for purposes of injection. There is, therefore, a pressing need in the art for a product of sodium formaldehyde sulphoxylate in substantially pure form which will resist decomposition to a material extent.

The purpose of this invention is to prepare such a product which will not only be stable indefinitely when packed in ampules under vacuum, but will also be comparatively stable in the air as an added safeguard against deterioration.

I have discovered that if sodium carbonate in varying amounts is incorporated with the sodium formaldehyde sulphoxylate in aqueous solution and the combination thus formed is precipitated from alcohol, a product of sodium formaldehyde sulphoxylate and sodium carbonate is formed which when ampuled in vacuum is stable indefinitely and appears to be stable for at least several months on exposure to the air. The products thus prepared give off no garlic-like odors and the available sodium formaldehyde sulphoxylate or reducing value, as determined by titration with a standard iodine solution, is not lowered during this period.

Examples illustrating the preferred procedures of carrying out this invention are as follows:

*Example No. 1.*—Combination of sodium formaldehyde sulphoxylate with ⅛ molecular equivalent of sodium carbonate 15.4 grams of technical sodium formaldehyde sulphoxylate assaying about 95% sodium formaldehyde sulphoxylate plus $2H_2O$ by iodine titration, are dissolved in 10 ccs. water containing 1.33 grams anhydrous sodium carbonate at a temperature not over 80° C. The mixture is filtered by suction on a heated suction funnel and, the filtrate while still hot, is poured in a thin stream into about 350 ccs. cold 95% alcohol with rapid stirring. The aqueous solution forms into globules, and as the dehydration proceeds, into hard granules. The mixture is stirred for ½ hour longer and then cooled in an ice bath. The supernatant alcohol is poured or siphoned off and the hard granules filtered on a suction filter. The product is washed on the filter with cold alcohol and finally with ether. The finished product is dried free of solvents in a vacuum preferably over solid caustic soda or soda lime. The product appears as colorless, partially dehydrated granules made up of fine, almost microscopic crystals. It has a slight aromatic odor but is devoid of any garlic-like smell. It contains from 19–20% water of crystallization and about 7.0% sodium carbonate, calculated as anhydrous. On titration with N/10 volumetric iodine solution, 100 milligrams require about 20.8–21.0 ccs. which is equivalent to 61.5 to 62.0% sodium formaldehyde sulphoxylate anhydrous.

*Example No. 2.—Combination of sodium formaldehyde sulphoxylate with $\frac{1}{10}$ molecular equivalent of sodium carbonate*

15.4 grams of technical sodium formaldehyde sulphoxylate, assaying about 95% sodium formaldehyde sulphoxylate plus $2H_2O$, are dissolved in 10 ccs. water, containing in solution 1.06 grams anhydrous sodium carbonate, at a temperature not over 80° C. The resulting mixture is filtered and precipitated from about 350 ccs. alcohol in the manner described in Example No. 1. The finished product is obtained as hard, coarse, partially dehydrated granules made up of fine almost microscopic crystals. It contains from 20–21% water of crystallization, and about 6.0% sodium carbonate, calculated as anhydrous On titration with N/10 volumetric iodine solution, 100 milligrams require about 22.5–23.0 ccs. which is equivalent to 66.5–68.0% sodium formaldehyde sulphoxylate anhydrous.

In the above described examples of carrying out the invention, the combined sodium formaldehyde sulphoxylate and sodium carbonate in concentrated aqueous solution were precipitated from about 20 parts of alcohol, the resulting product forming in coarse amorphous to fine crystalline granules.

In the following examples, the sodium formaldehyde sulphoxylate combined with sodium carbonate was partially dehydrated by pouring the mixture into and stirring it for a relatively short time with about $\frac{1}{10}$ the previous amount of alcohol and then after allowing the mixture to separate into two layers, the product was allowed to crystallize from the aqueous layer by allowing the mixture to stand in the cold or in an ice bath. In this manner of procedure, a product is obtained which is definitely crystalline resembling in appearance crystals of pure sodium formaldehyde sulphoxylate, but which contain in addition, in close mechanical combination, very fine crystals of sodium carbonate.

*Example No. 3.—Crystalline combination of sodium formaldehyde sulphoxylate with $\frac{1}{8}$ molecular equivalent of sodium carbonate*

30.8 grams (0.2 mol.) technical sodium formaldehyde sulphoxylate are dissolved in 20 ccs. water containing 2.65 grams (⅛ molecular equivalent) anhydrous sodium carbonate, at not over 80° C. The hot solution is filtered by suction on a preheated suction funnel. The hot clear solution is then poured into about 50 ccs. cold 95% alcohol with moderate stirring, to form an emulsion, for approximately 10 minutes, or until signs of crystals appear on the sides of the vessel. On standing, the mixture separates into two layers, the lower layer being the aqueous solution of sodium formaldehyde sulphoxylate and sodium carbonate and the upper layer consisting of diluted alcohol. The warm mixture is allowed to stand at room temperature for several hours, and then in an ice bath with occasional stirring to prevent caking. The product finally crystallizes to a semi-hard crystalline mass. This is broken up, the crystals filtered, washed several times with small quantities of cold alcohol and finally with ether. The product is dried at room temperature in vacuum over flaked caustic soda. The finished product consists of fairly uniform medium-sized colorless crystals. The yield is about 90% of theory. The product contains from 20–21% water of crystallization, and from 5.5–6.0% sodium carbonate calculated as anhydrous. On titrating with N/10 volumetric iodine solution, 100 milligrams require from 23–23.5 ccs., which is equivalent to 68–69.5% sodium formaldehyde sulphoxylate anhydrous.

*Example No. 4.*—This preparation was made with $\frac{1}{10}$ molecular equivalent of anhydrous sodium carbonate. Otherwise the method of preparation was the same as described in Example No. 3.

The finished product is obtained in fairly large crystals containing 20–21% water of crystallization. It contains 5.0–5.5% sodium carbonate, calculated as anhydrous, and requires 23.5–24.0 ccs. N/10 volumetric iodine solution per 100 milligrams, equivalent to 69.5–71% sodium formaldehyde sulphoxylate anhydrous.

The various products prepared according to the methods described in the above examples are all very soluble in water forming clear water-white solutions. The pH of a 10% solution is around 10.0–10.1. The technical product in 10% solution has a pH equal to 10.05 determined by means of the glass electrode.

The amounts of added sodium carbonate to be used may be varied over a wide range from a minimum of 2% of the total sodium formaldehyde sulphoxylate to a maximum of 20% of the total sodium formaldehyde sulphoxylate. Since the total reducing value or available sodium formaldehyde sulphoxylate in the product is the important active constituent, too large a proportion of sodium carbonate would tend to reduce this active constituent and would, therefore, be inadvisable. For practical purposes, our preferred compositions are those containing from 4.5 to 7.5% sodium carbonate, or roughly from $\frac{1}{10}$ to $\frac{1}{8}$ molecular equivalent of sodium carbonate. Products containing these preferred amounts of sodium carbonate are exceptionally stable in vacuum and relatively stable when exposed to the air. Upon opening of an ampule or a stoppered bottle, only a slight aromatic odor, distinguishable from the characteristic garlic-like odor, is noticeable. Upon titration with iodine, no reduction of available sodium formaldehyde sulphoxylate is detectable.

My preferred composition contains from 19–20% water of crystallization and 80–81% solids, which consists of 68–70% of available sodium formaldehyde sulphoxylate anhydrous, 5–7% sodium carbonate, calculated as anhydrous, and 3–6% inert oxidized material.

I have also found that sodium formaldehyde sulphoxylate either in the form of a pure technical product or a pure crystalline product may be mechanically mixed with sodium carbonate in various proportions, sufficient to stabilize the sodium formaldehyde sulphoxylate for limited periods, by grinding or powdering the sodium formaldehyde sulphoxylate with the sodium carbonate until an intimate mixture is obtained. The products thus formed are soluble in water and apparently give the same therapeutic effect when freshly used as the products formed by the methods given in Examples 1 to 4. Although these products are relatively stable when packed in ampules under vacuum, they are not as stable as the products obtained by precipitation from alcohol. After about 5 weeks incubation, the products so prepared give off a marked garlic-like odor and when exposed to the air or in stoppered tubes, evidence of decomposition is noticeable after several weeks.

While I have specified in the above disclosure the use of anhydrous sodium carbonate, the hydrated forms of sodium carbonate, such as the monohydrate or the decahydrate may be used. I also do not limit myself to the use of sodium carbonate. Other alkali carbonates soluble in water and relatively non-toxic, as for example potassium carbonate, may be used. Likewise, other alkaline salts, readily soluble in water but relatively insoluble in alcohol, as for example tri-sodium phosphate or di-sodium phosphate, or other alkali salts of weak acids such as sodium acetate capable of acting as alkalizing agents, may be substituted for the alkali carbonates. In short, the stabilization may be effected with any water soluble alkaline substance which is not soluble or difficultly soluble in alcohol and the like.

It is also to be understood that the invention is not restricted to the use of ethyl alcohol as a precipitating and dehydrating agent. I have found that other alcohols readily miscible with water, as for example, methyl or isopropyl alcohol may be used. Likewise other organic solvents miscible with water, such as acetone, may be employed as a precipitating medium. Thus for the purposes of this invention any organic solvent readily miscible with water and which will not dissolve alkali salts, such as sodium carbonate and the like, acts as an equivalent of alcohol.

What I claim is:

1. A method for preparing a stable product of sodium formaldehyde sulphoxylate which comprises dissolving in an aqueous solution at a temperature not over 80° C., technical sodium formaldehyde sulphoxylate together with a lesser amount of a relatively non-toxic alkaline salt, soluble in water but insoluble in organic solvents which are readily miscible with water and precipitating the mixture by means of such an organic solvent readily miscible with water.

2. A method for preparing a stable product of sodium formaldehyde sulphoxylate which comprises dissolving in aqueous solution at a temperature not over 80° C., technical sodium formaldehyde sulphoxylate together with a relatively non-toxic alkaline salt readily soluble in water but relatively insoluble in water-miscible organic solvents, in a proportion sufficient to stabilize the sodium formaldehyde sulphoxylate, precipitating the mixture so prepared by means of such a water-miscible organic solvent and stirring the mixture until the product has solidified to crystalline granules.

3. A method for preparing a stable product of sodium formaldehyde sulphoxylate which comprises dissolving in aqueous solution at a temperature not over 80° C., technical sodium formaldehyde sulphoxylate together with an alkali carbonate in an amount ranging from 2–20% of the sulphoxylate, pouring the mixture so prepared into an aliphatic alcohol readily miscible with water and stirring the resulting mixture until the product of sodium formaldehyde sulphoxylate combined with the alkali carbonate has solidified to crystalline granules.

4. A method for preparing a stable product of sodium formaldehyde sulphoxylate which comprises dissolving in aqueous solution at a temperature not over 80° C., technical sodium formaldehyde sulphoxylate together with sodium carbonate in an amount ranging from 2–20% of the sulphoxylate, pouring the mixture so prepared into ethyl alcohol, stirring the resulting mixture until the product of sodium formaldehyde sulphoxylate combined with sodium carbonate has solidified to crystalline granules, and separating and drying the resulting product.

5. A method for preparing a stable product of sodium formaldehyde sulphoxylate which comprises dissolving in aqueous solution at a temperature not over 80° C. 1 molecular part of technical sodium formaldehyde sulphoxylate with $\frac{1}{10}$ part molecular equivalent of anhydrous sodium carbonate, precipitating the mixture so prepared by pouring it into about 20 parts by volume of ethyl alcohol, stirring the resulting mixture until the product of sodium formaldehyde sulphoxylate and sodium carbonate has solidified to crystalline granules, separating the resulting product and drying it in vacuum.

6. A method for preparing a stable crystalline product of sodium formaldehyde sulphoxylate which comprises dissolving together in warm aqueous solution technical sodium formaldehyde sulphoxylate with a proportion of anhydrous sodium carbonate ranging from 2–20% of the sulphoxylate, adding the resulting mixture with vigorous stirring for approximately 10 minutes to an amount of ethyl alcohol sufficient to partially remove some of the water from the sodium formaldehyde sulphoxylate-sodium carbonate mixture, allowing the liquids to separate and then allowing the mixture to stand, first at room temperature and then at a refrigerating temperature, to form uniform crystals consisting of sodium formaldehyde sulphoxylate and sodium carbonate in stable mechanical combination, separating the resulting product and drying it in vacuum.

7. A method for preparing a stable crystalline product of sodium formaldehyde sulphoxylate which comprises dissolving together in aqueous solution at a temperature not over 80° C. 1 molecular part of technical sodium formaldehyde sulphoxylate with $\frac{1}{10}$ part molecular equivalent of anhydrous sodium carbonate, pouring the resulting mixture into about 2 parts by volume of ethyl alcohol, stirring the resulting mixture vigorously for approximately 10 minutes, and then allowing the mixture to stand to crystallize, first at room temperature and then at a refrigerating temperature, separating the resulting product and drying in vacuum.

8. A stable granular or crystalline combination of sodium formaldehyde sulphoxylate and a relatively non-toxic alkaline salt readily soluble in water but relatively insoluble in an organic solvent readily miscible with water, the alkaline salt being present in the stable combination in an amount sufficient to stabilize the sodium formaldehyde sulphoxylate.

9. The product as defined in claim 8 wherein the alkaline salt is present in amounts ranging from 2–20% of the sulphoxylate.

10. A stable granular or crystalline combination of sodium formaldehyde sulphoxylate and a relatively non-toxic alkaline salt readily soluble in water but relatively insoluble in alcohol, the alkaline salt being present in the stable combination in an amount ranging from 2–20% of the sulphoxylate.

11. A stable granular or crystalline combination of sodium formaldehyde sulphoxylate and an alkali carbonate, the latter being present in the combination in an amount sufficient to stabilize the sodium formaldehyde sulphoxylate.

12. A stable crystalline combination of sodium formaldehyde sulphoxylate and an alkali carbonate, the latter being present in the combination in mechanically combined form and in an amount ranging from 2–20% of the sulphoxylate.

13. A stable combination of sodium formaldehyde sulphoxylate and sodium carbonate in granular or crystalline form consisting of 1 molecular equivalent of sodium formaldehyde sulphoxylate and approximately $\frac{1}{10}$ molecular equivalent of sodium carbonate.

14. A stable crystalline combination of sodium formaldehyde sulphoxylate and sodium carbonate, readily soluble in water, having therapeutic properties and consisting of 19–20% water of crystallization, 68–70% sodium formaldehyde sulphoxylate, calculated as anhydrous, 5–7% sodium carbonate, calculated as anhydrous, and 3–6% of inert substances.

LOUIS FREEDMAN.